(12) United States Patent
Kulkarni et al.

(10) Patent No.: US 7,636,469 B2
(45) Date of Patent: Dec. 22, 2009

(54) MOTION PICTURE CONTENT EDITING

(75) Inventors: Manish S. Kulkarni, Saratoga, CA (US); Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 454 days.

(21) Appl. No.: 11/264,879

(22) Filed: Nov. 1, 2005

(65) Prior Publication Data

US 2007/0098256 A1    May 3, 2007

(51) Int. Cl.
*G06K 9/00*    (2006.01)

(52) U.S. Cl. ..................................... 382/162

(58) Field of Classification Search .......... 382/162–167
See application file for complete search history.

(56) References Cited

U.S. PATENT DOCUMENTS 6,028,623 A * 2/2000 Fach ........................... 348/97
6,628,823 B1 * 9/2003 Holm ........................ 382/162

FOREIGN PATENT DOCUMENTS

WO    WO-2007053745 A2    5/2007
WO    WO-2007053745 A3    5/2007

OTHER PUBLICATIONS

"Photography and graphic technology—Extended colour encodings for digital image storage, manipulation and interchange—Part 1: Architecture and requirements", ISO 22028-1:2004. (Mar. 15, 2004), 1-54.
"International Application Serial No. PCT/US2006/042798, International Search Report mailed May 20, 2008", 4 pgs.
"International Application Serial No. PCT/US2006/042798, Written Opinion mailed May 20, 2008", 6 pgs.
Patterson, Richard, "Converting Density to XYZ", (Nov. 2, 2005), 7 pgs.
Patterson, Richard, "Deriving Scene Referred Color from Negative Densities", (Nov. 2, 2005), 7 pgs.

* cited by examiner

*Primary Examiner*—Wesley Tucker
(74) *Attorney, Agent, or Firm*—Schwegman, Lundberg & Woessner, P.A.

(57) ABSTRACT

Processing Digital Picture eXchange (DPX) data obtained by scanning Negative Camera Film to colormetrically recreate an original de-rendered scene image is described. One method described includes converting a DPX color file, obtained from scanning a camera negative film used to capture a scene with a film camera, to scene color data using an ICC Color management engine. The ICC Color management engine executes an ICC color profile created using parameters representing a characteristic curve and spectral sensitivity of the camera negative film.

4 Claims, 5 Drawing Sheets

MOTION PICTURE CONTENT EDITING

TECHNICAL FIELD

The subject matter herein relates to data processing.

BACKGROUND INFORMATION

The motion picture industry is increasingly relying on computer systems to modify and preview films. A typical motion picture workflow begins with a camera recording a scene on a medium such as an original camera negative (OCN) for traditional cameras or digital media (e.g., optical or magnetic media) for digital cameras. A digitized representation of captured images may be then provided to a computer workstation, such as by scanning the film. The workstation may include one or more monitors on which the appearance of the digitized data can be previewed. Editorial modifications may be made and special effects may be added to the digitized data. Thereafter, for traditional film projectors, the digitized data (with the modifications and special effects) may be transferred to film for projection on a cinema screen. Alternatively, the digitized data may be transferred to a digital projector for projection on the cinema theater screen.

Any manipulations to the digitized data (e.g., computer rendered special effects, combinations of multiple footage from multiple scenes, etc.) often do not appear as realistic as desired due to the film scanning operation.

DETAILED DESCRIPTION

In the following detailed description, reference is made to the accompanying drawings which form a part hereof, and in which is shown, by way of illustration, different embodiments in which the invention may be practiced. These embodiments are described in sufficient detail to enable those skilled in the art to practice the invention. Other embodiments may be utilized and structural, logical, and electrical changes may be made without departing from the scope of the present invention.

The following describes processing Digital Picture eXchange (DPX) data obtained by scanning film to recreate an original filmed scene image. Parameters used to process the data can be stored as an INTERNATIONAL COLOR CONSORTIUM format color profile (ICC Profile), and the scene image used in Color Managed workflows to apply Special Effects to the processed DPX images to make the Special Effects appear more realistic. It will be appreciated by the skilled artisan that other color profiles and other file formats may be utilized with similar characteristics. A benefit of one embodiment is to create a digital representation of scene colors captured on film that colormetrically represents the original scene colors using a created ICC profile.

Although not required, embodiments of the invention are described in the general context of computer-executable instructions, such as program modules, being executed by a personal computer. Generally, program modules include routines, programs, objects, components, data structures, etc. that perform particular tasks or implement particular abstract data types. Those skilled in the art will appreciate that other computer system configurations, including hand-held devices, multi-processor systems, microprocessor based or programmable consumer electronics, network PCs, minicomputers, mainframe computers, and the like can be used to practice embodiments of the invention.

Figure 1:
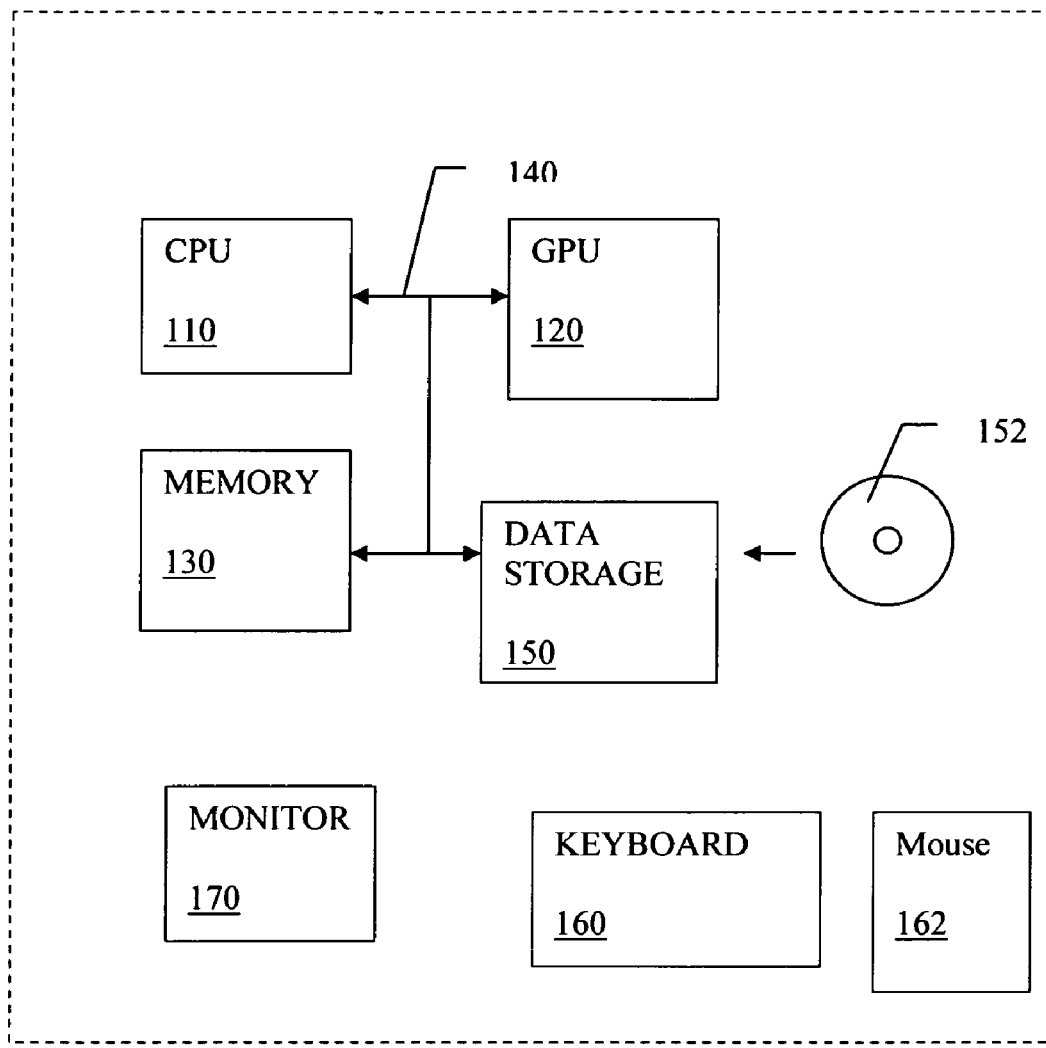
FIG. 1 is a block diagram illustrating a system of an embodiment of the present invention.

An example system for implementing embodiments of the invention is illustrated in FIG. 1. FIG. 1 shows a diagrammatic representation of a machine system in the exemplary form of a computer system 100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 100 includes a central processing unit (CPU) 110, a graphics processing unit (GPU) 120, a main memory 130 which can include a static memory, which communicate with each other via a bus 140. The computer system may further include a video display unit 170 (e.g., a liquid crystal display (LCD) or a cathode ray tube (CRT)). The computer system can also include an alphanumeric input device 160 (e.g., a keyboard), a user interface (UI) navigation device 162 (e.g., a mouse), a disk drive unit 150.

The disk drive unit 150 includes a machine-readable medium 152 on which is stored one or more sets of instructions and data structures (e.g., software) embodying or utilized by any one or more of the methodologies or functions described herein. The software may also reside, completely or at least partially, within the main memory 130 and/or within the processor(s) 110/120 during execution thereof by the computer system 100, the main memory 130 and the processor(s) 110/120 also constituting machine-readable media.

The software may further be transmitted or received over a network via a network interface device utilizing any one of a number of well-known transfer protocols (e.g., HTTP).

While the machine-accessible medium 152 is shown in an exemplary embodiment to be a single medium, the term "machine-accessible medium" should be taken to include a single medium or multiple media (e.g., a centralized or distributed database, and/or associated caches and servers) that store the one or more sets of instructions. The term "machine-accessible medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-accessible medium" shall accordingly be taken to include, but not be limited to, solid-state memories, optical and magnetic media, and carrier wave signals.

Embodiments of the present invention provide methods to convert DPX colors to a scene space, and use an ICC Color Management Engine for the conversions. See INTERNATIONAL COLOR CONSORTIUM Specification ICC.1:2004-10. These methods enable manipulation, editing and application of special effects in DPX files to appear more realistic in a finished product. Using an ICC Profile allows an existing ICC Color Management architecture to be leveraged for the color conversions.

Color management using the International Color Consortium ("ICC") standard is widely implemented for converting color data from one color space to another color space. That is, ICC profiles provide a cross-platform device profile format. ICC profiles can be used to translate color data created on one device into the native color space of another device. Use of such color profiles allow end users to transparently move profiles and images with embedded profiles between different operating systems while maintaining color fidelity. For example, a color output from one device or software to another device or software needs to be converted (or translated) to maintain a consistent color output. Often software executed on a computer, such as image processing software, includes a color engine to determine the proper operations needed to convert color data from one ICC profile to another ICC profile. Color conversions can be performed using look-up tables (LUT) and matrix calculations.

The following may be based on, for illustrative purposes, digitized data obtained from film by a DPX system that may be illuminated by a projection system using a xenon light source. The term film generally refers to a light sensitive device, such as but not limited to celluloid covered in a light sensitive emulsion. The digitized data may be in one of many standards including DPX files. After the processing of the digitized data has been completed, the digitized data may be recorded back onto negative film which in turn is printed onto print film for projection onto a cinema screen. Alternatively, the digitized data may be provided to a digital projector and directly projected onto a cinema screen. Other print films, scanners, and illuminants may be utilized depending on the desired implementation. In particular, the subject matter described herein may also be used in connection with a workflow involving a digital camera and/or a digital projector.

The digitized image file format may be a CINEON format file which stores data in ten bit density using printing densities. In some variations, file formats may be used that store data using Status M densities (which may, for example, be derived from printing densities). The CINEON image file format is a subset of the ANSI/SMPTE DPX file format. A DPX format file consists of four parts: (i) a generic file information header having a fixed format, predefined, general information header consisting of several sections (generic, image, data format and image origination); (ii) a motion picture and television industry specific header having a fixed format, industry (television, film) specific header; (iii) user-defined information including variable length, user defined data; and (iv) image data.

Figure 2:
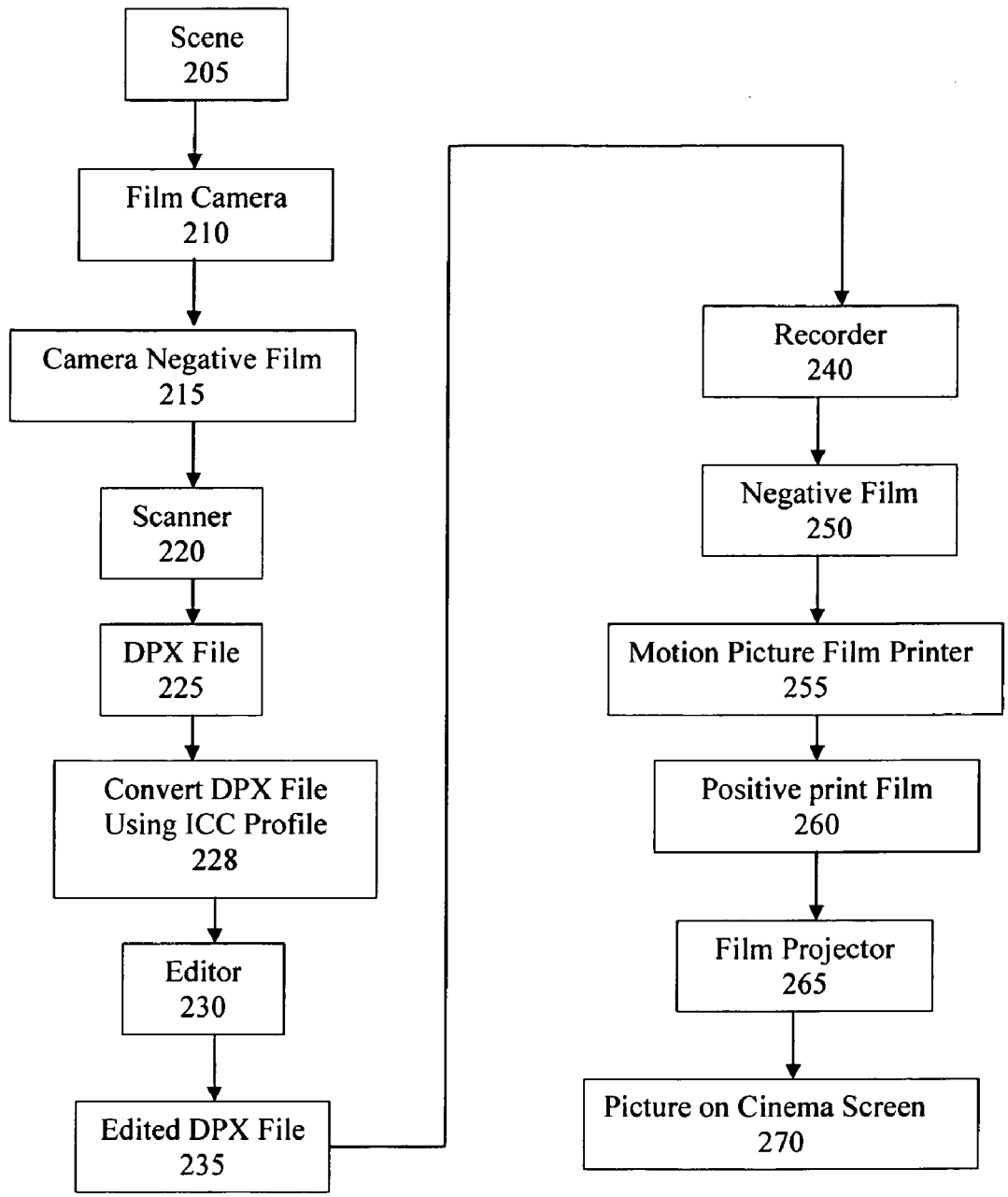
FIG. 2 illustrates a workflow according to an embodiment of the present invention.

FIG. 2 illustrates a motion picture workflow 200 in which a scene 205 may be captured by a film camera 210 on camera negative film 215. The camera negative film 215 may be scanned by a scanner 220 to generate a CINEON/Digital Picture eXchange (DPX) format file 225. The DPX file is converted 228 using an ICC profile as explained below. The DPX file 225 may be viewed and altered in an editor 230 to generate an edited DPX file 235. The edited DPX file 235 may then be transferred to negative film 250 by a recorder 240. Thereafter, the negative film 250 may be developed into a positive print film 260 by a motion picture film printer 255. The positive print film 260 may be loaded into a film projector 265 so that a picture may be projected onto a cinema screen 270.

As stated above, in a Digital Motion Picture workflow the Original Camera Negative (OCN) that contains the captured scene is scanned using film scanners and converted to a digital DPX file that is encoded in a 10-bit Printing Density. The DPX file can be digitally manipulated on a computer, and recorded back onto film. The recorded film is then used for projection in the theatre. The manipulations that are done on the computer include the addition of "Effects" that range from basic changes such as improving brightness/contrast to very complex effects such as high-dynamic range toning. These Effects are generally added using Computer Software such as Adobe® After Effects® software from Adobe Systems, Inc.

Many of the computer effects that are added to the content in the DPX files require that the content first be converted to a scene space, which is a representation of the original appearance of the content in the real world. This is necessary in order for the effects to produce the most realistic results. Embodiments of the present invention convert the content of the DPX Files to the scene space.

Methods described herein include determining the color conversion parameters required to convert DPX files to the scene space. These color conversion parameters are saved as an ICC Profile which can be used by a Color Management Engine to convert the colors in a DPX file to the scene space. The conversion from a DPX RGB Space to a Scene Space (for editing) and the conversion from Scene Space back to a DPX RGB Space (after editing) are performed using the ICC Profile. As such, the ICC Profile contains color conversion parameters to convert from the DPX RGB Space to the Scene Space as well as parameters to convert from the Scene Space back to the DPX RGB Space.

The term scene as used herein refers to something seen by a viewer, such as an image captured on film. The film captures the scene based upon known light sensitivity principles. When an exposed film is scanned to convert the light-captured scene into digital data the scanned conversion does not accurately recreate or represent the light colors originally captured on film. Methods described herein provide a conversion process that converts the color data obtained by scanning the film and provides scene color data that colormetrically represents the original scene colors as captured on film. As such, the terms scene color data is data provided as an output of a color conversion. Some of the described processes use an ICC profile created using parameters representing a characteristic curve and sensitivity of the actual film used to capture the scene.

Figure 3:
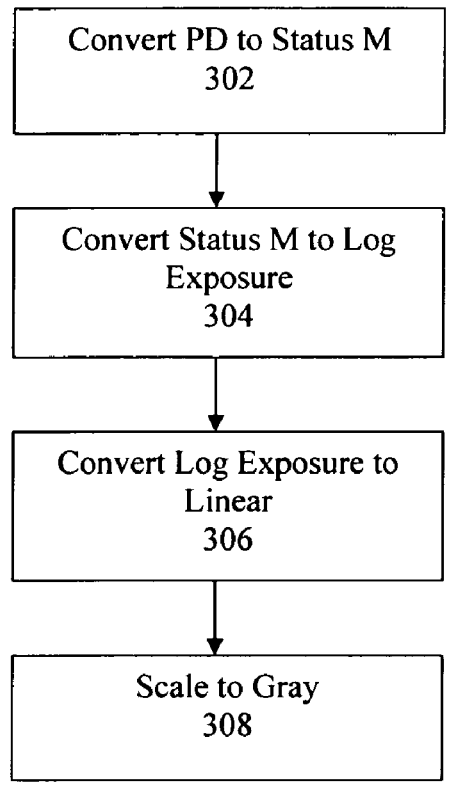
FIG. 3 illustrates a workflow according to an embodiment of the present invention to create LUT curves.
Figure 4:
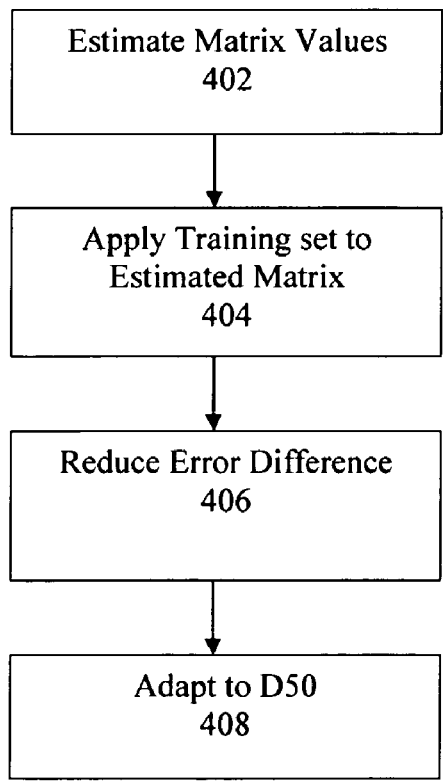
FIG. 4 illustrates a workflow according to an embodiment of the present invention to create a Matrix.

FIG. 3 illustrates a method 300, according to an example embodiment, for generating three tone reproduction curves (TRCs) in a process flow diagram. FIG. 4 illustrates a method 400, according to an example embodiment, for generating a matrix in a process flow diagram. In one embodiment, DPX RGB color space values may be converted to Commission Internationale de L'Eclairage (CIE) XYZ color space values using TRCs and a 3×3 Matrix, to convert DPX R'G'B' to XYZ. That is, DPX R'G'B'→[TRCs]→RGB →[3×3Matrix]→XYZ. The data for such a conversion may be stored in a color profile such as an ICC Profile.

FIG. 3 illustrates a process 300 according to an embodiment to generate three identical 1D LUTs using published Kodak 5218 Characteristic Curves for KODAK VISION2 500T Color Negative Film 5218. As a first sub-operation 302, the DPX Printing Density (PD) Range [0, 2.046] is converted to a Status M (StM) value using a simple linear relationship: StM =0.6144+0.9355*PD. The resulting Status M range [0.6144, 2.5284] is converted to Log Exposure using the full published Kodak 5218 Characteristic Curve data at sub-operation 304. Different film characteristic curves can be used to correspond to the film used. Next at sub-operation 306, the Log Exposure data is converted to Linear values using Linear Value=10 ^(−Log Value). Finally, the resultant linear TRC may be adjusted, or scaled, at sub-operation 308 to map a DPX 470 value to a reference gray value (e.g., a value from 10% gray to 20% gray, such as 18% gray).

As a result of process 300, three tone reproduction curves (TRCs) are generated using the film characteristics and represented by three 1D LUTs. These LUTs are used to convert the DPX R'G'B' values to RGB values.

Referring to FIG. 4, a 3×3 Scene Matrix is determined 400 using estimated XYZ Color Matching Functions. The Scene Matrix will be used to convert the RGB values from the TRCs to XYZ values.

As a first sub-operation 402 to create the ICC Matrix, XYZ Color Matching Functions are estimated as a 3×3 Matrix transform of the RGB Sensitivities (spectral sensitivities) of Kodak 5218 Camera Film. A set of Natural Object Spectra under D65 illuminant is used in one embodiment as a training set 404. Those skilled in the art recognize that the D65 illuminant is intended to represent average daylight throughout the visible spectrum. The 3×3 Matrix is chosen such that an error difference (Delta-E) between the XYZ output values from the estimated matrix using the training set and actual XYZ values is minimized 406. The resultant matrix is chromatically adapted to ICC D50 Illuminant to provide the Scene Matrix 408. One method of performing chromatic adaptation is described in Annex E of the INTERNATIONAL COLOR CONSORTIUM Specification.

Figure 5:
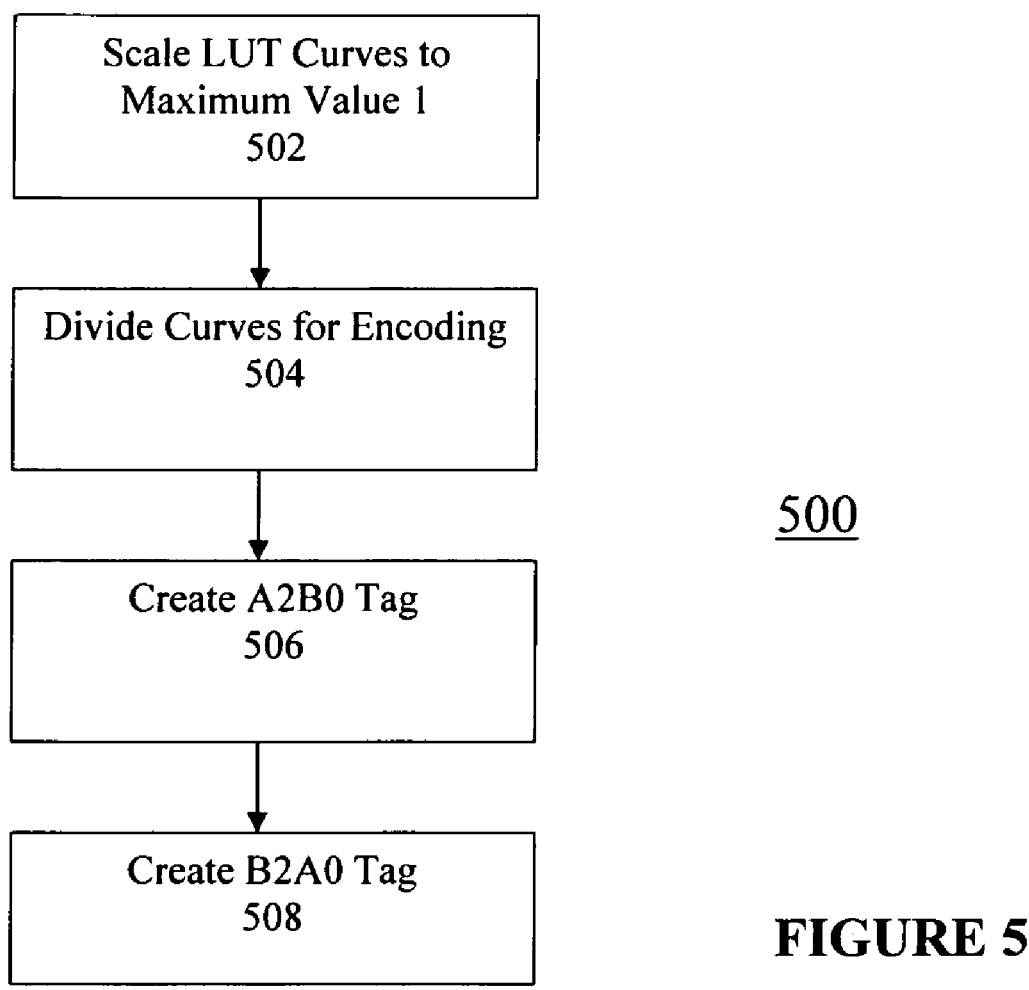
FIG. 5 illustrates a workflow according to an embodiment of the present invention to code an ICC profile.

Referring to FIG. 5, a V4 ICC Profile (see ICC.1:2004-10 (Profile version 4.2.0.0)) is created with process 500. The ICC profile is created by creating both A2B0 and B2A0 tags.

The 1D LUTs values range from approximately 0.00185 to 75.83, as described above. These values are scaled 502 so that the maximum value is 1, giving a range approximately of [2.4459e-5, 1]. These scaled curves have a very small slope in the beginning making it difficult to encode as an ICC Profile, which has only 16-bit precision. In one embodiment, the curves are divided into two curves 504 to allow for encoding. The first curve is the original curves to the power 0.5, and the second curve is simply a gamma function with exponent 2.0 applied to the first curve. Raising the original curve to a power of 0.5 decreases the slope sufficiently so that the curve can be accurately encoded in the ICC Profile. The gamma value, however, is not limited to exactly 0.5 but can be any fractional value that changes the slope of the curve to allow encoding. As such, a value of about 0.5 generally refers to other values such as but not limited to 0.3, 0.4, 0.6 ect.

Those skilled in the art recognize that the A2B0 tag defines a color transform from Device to a Profile Connected Space (PCS) using lookup table tag element structures and the B2A0 tag defines a color transform from PCS to Device using lookup table tag element structures. See INTERNATIONAL COLOR CONSORTIUM Specification ICC. 1:2004-10. The A2B0 color transform follows the following sequence: ("A" curves)→(Multidimensional lookup table—CLUT)→("M" Curves)→(Matrix)→("B" Curves). The B2A0 color transform follows the following sequence: ("B" curves)→(Matrix)→("M" Curves)→(Multidimensional lookup table—CLUT)→("A" Curves).

The Scene Matrix described above is encoded as-is, so the overall A2B0 tag (RGB to XYZ) for the ICC Profile is generated 506 as:

A Curves: Scene Curve, with gamma 0.5
Color Look-up Table (CLUT): Identity (null operation)
M Curves: Parametric Curve, gamma 2.0 (which is 1/0.5)
Matrix: Scene Matrix
B Curves: Identity (null operation)

For creating the B2A0 tag (XYZ to RGB) 508 for the ICC Profile, the process is inverted as:

B Curves: Identity (null operation)
Matrix: inverse of Scene Matrix
M Curves: Parametric Curve, gamma 0.5 (which is 1/2.0)
CLUT: Identity (null operation)
A Curves: Inverse of Scene Curve, with gamma 2.0

Two curves are required in the B2A0 tag to avoid extremely high interpolation errors in the dark regions of the curve.

Using a gamma of 2.0 with the inverse Scene Curve simplifies processing, because the M-curve can then be implemented using a square root operation which is generally faster than a general power function implementation. Thus using a gamma of 2.0 with the inverse Scene Curve is faster than using a different gamma, for example 4.0 .

The Media White Point in the Profile in one embodiment is set to be 75.83 (max value of un-scaled Scene Curve) times D50. The reason for doing this is that when Absolute Colorimetric rendering intent is used, the Color Management Engine does the correct scaling of the Scene Curve to the full DPX range. This is a part of ensuring that the entire DPX Range can be encoded in ICC Profiles that otherwise do not support over-range data outside of a [0, 1] range.

The above embodiments convert DPX colors to Scene colors using parameters derived from spectral characteristics of the Original Camera Negative. It will be appreciated that positive film can be scanned, and the invention is not limited to negative film. In addition to film, the present method can be applied to color data obtained from light sensitive devices such as CCD's (charge coupled devices) and other semiconductor based devices.

An ICC color profile is used in one embodiment for the conversion. The ICC color profile uses look-up tables and a matrix for the conversion. A method described herein to determine 1D LUT's includes converting Printing Density to Status M and then to Linear values. A method described herein to determine the matrix includes error minimization using a natural objects spectra as a training set, and estimates XYZ Color Matching Functions. The ICC Profile encoding described herein splits the tone reproduction curves (TRCs) into two, specifically the Inverse Scene Curve with a Gamma of 2.0 to improve performance. Finally, the method described herein to encode entire DPX range includes over-range data in the ICC Profile.

Figure 6:
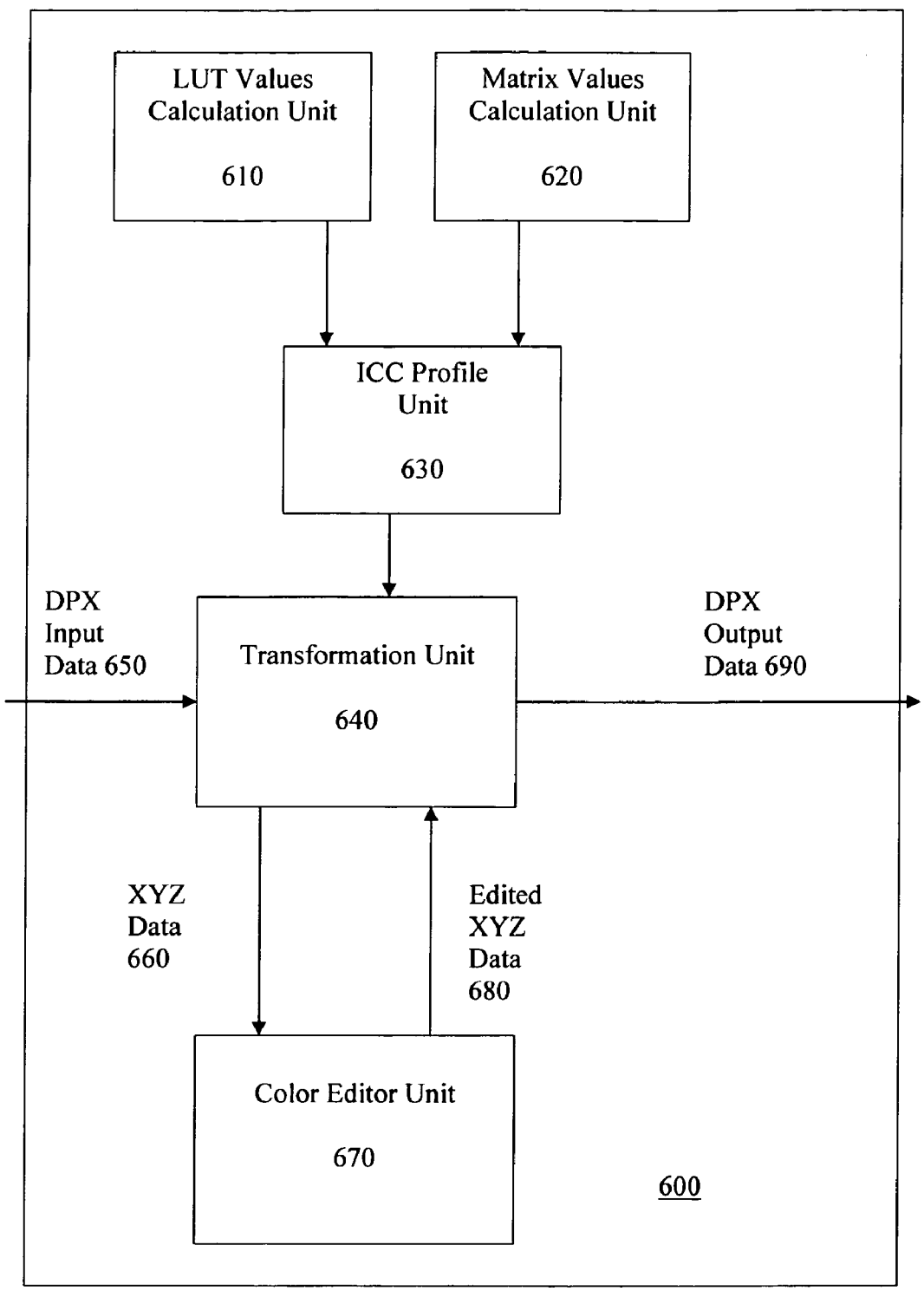
FIG. 6 illustrates an apparatus to implement processes similar to that provided in FIGS. 2-4.

FIG. 6 illustrates an apparatus 600 that may be standalone or may be integrated into the apparatus of FIG. 1. A LUT values calculation unit 610 is provided to determine LUT values as described above using characteristics of a film. Likewise, a matrix values calculation unit 620 is provided to determine matrix values as described above using RGB sensitivities of the film. An ICC unit 630 uses the values determined for the LUTs and the matrix to encode an ICC Profile for execution by transformation unit 640. The transformation unit transforms a DPX input data 650 into XYZ data 660 provided to editor unit 670. As explained above, the editor unit allows for edits to be made to the color data. The edited XYZ color data 680 is provided to the transformation unit 640 which converts the edited color data to output DXP color data 690 which can be transferred to film, as explained above.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of processing data comprising:
    exposing a light sensitive device to light to capture a scene;
    generating a Digital Picture eXchange (DPX) format color file representing the captured scene,
    generating look-up tables (LUTs) by converting a printing density range to a Status M density range,
    converting the Status M density range to log exposure using characteristic curves of the light sensitive device and converting the log exposure to the linear values; and
    converting the DPX format color file to scene color data using an ICC color management engine, wherein the ICC color management engine executes an ICC color profile created using the generated look-up tables, wherein converting the DPX color file to the scene color data using an ICC color management engine comprises:
        encoding at least three tone reproduction curves (TRCs); and
        applying the TRC's to a matrix operation.

2. The method of claim 1, wherein encoding the at least three TRCs comprises adjusting a slope of the TRCs to encode the TRCs with at a lower precision.

3. The method of claim 1, wherein encoding the at least three TRCs comprises applying two gamma operations to the TRCs, wherein a first gamma operation is an inverse of the second gamma function.

4. The method of claim 1 further comprising:
    manipulating the scene color data;
    converting the manipulated scene color data into a second DPX color file using the ICC Color management engine, wherein the converting comprises:
        applying an inverse matrix to convert the manipulated color data into matrix output data having a DPX color format; and
        applying two look-up tables to the matrix output; and
    recording the second DPX color file for image display.

* * * * *

UNITED STATES PATENT AND TRADEMARK OFFICE
CERTIFICATE OF CORRECTION

PATENT NO. : 7,636,469 B2  Page 1 of 1
APPLICATION NO. : 11/264879
DATED : December 22, 2009
INVENTOR(S) : Kulkarni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Twenty-first Day of December, 2010

David J. Kappos
*Director of the United States Patent and Trademark Office*